June 7, 1955 W. E. RAKER 2,710,093
FISHERMAN'S TACKLE BOX
Filed July 30, 1953 2 Sheets-Sheet 1
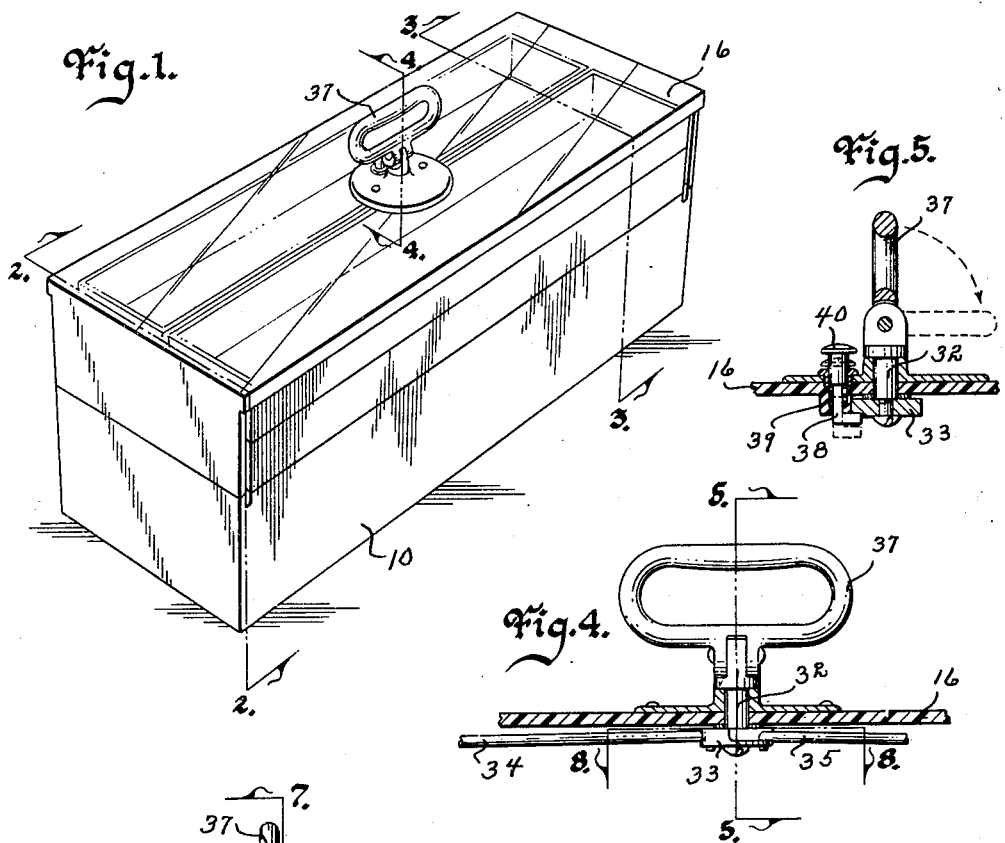
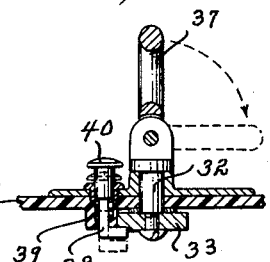
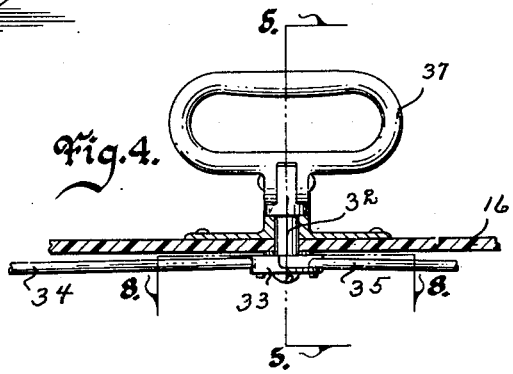
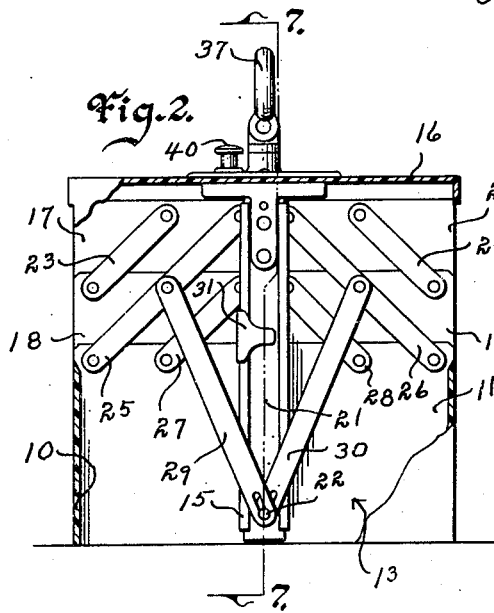
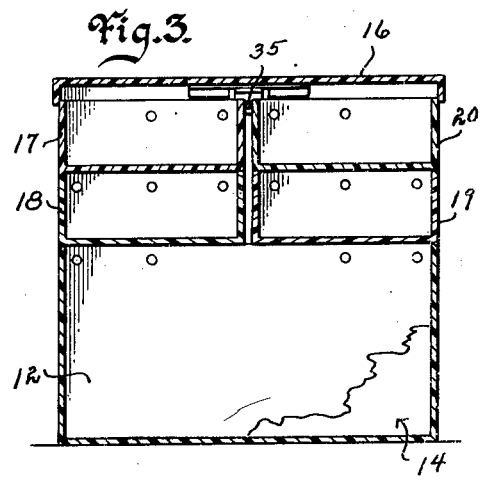
Inventor
Winfred Edward Raker
by Talbert, Dick & Adler
Attorneys
Witness
Edward P. Seeley June 7, 1955　　　　　W. E. RAKER　　　　2,710,093
FISHERMAN'S TACKLE BOX
Filed July 30, 1953　　　　　　　　2 Sheets-Sheet 2
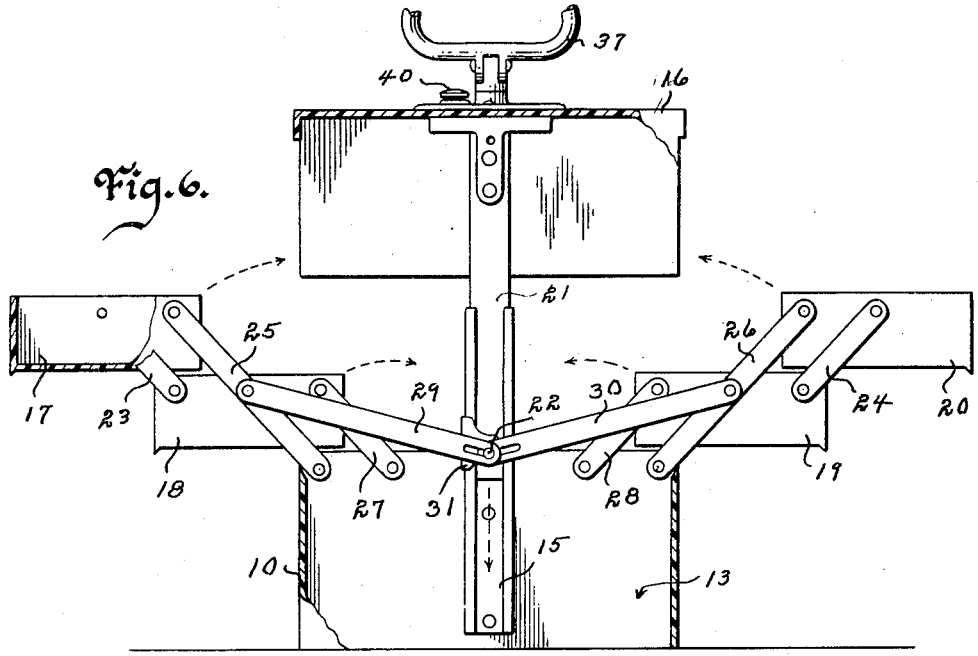
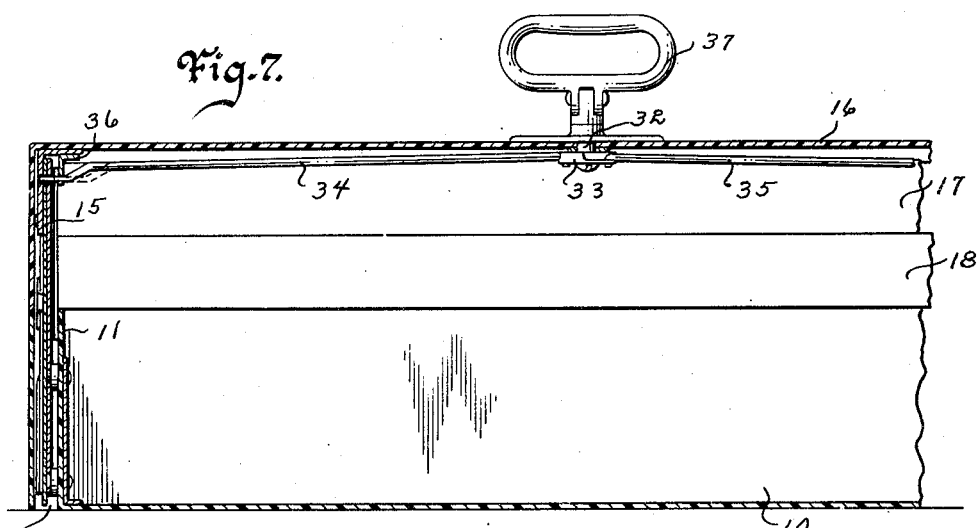
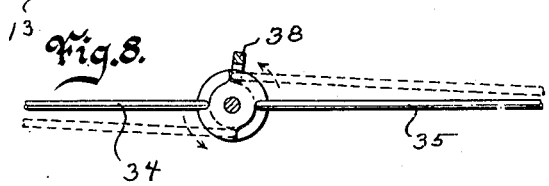
Inventor
Winfred Edward Raker
by Talbert Dick & Adler
Attorneys
Witness
Elwood P. Seeley

United States Patent Office 2,710,093
Patented June 7, 1955

2,710,093

FISHERMAN'S TACKLE BOX

Winfred Edward Raker, Fort Dodge, Iowa, assignor to Sar, Incorporated, Fort Dodge, Iowa, a corporation of Iowa Application July 30, 1953, Serial No. 371,222

4 Claims. (Cl. 206—16)

This invention relates to tackle boxes and more particularly to containers for holding the fishing gear of fishermen.

The use of tackle boxes in the fishing art is very old. Such boxes mainly comprise a box having a hinged lid, a handle on the lid, a locking means on the side of the box, and removable trays within the box. One objection to such boxes is that if the lock is not fastened, and the box is then lifted by the handle, the lid pivots upwardly and the box downwardly, thereby spilling the contents from the box. Another disadvantage is that when the lid is purposely opened, with the box portion resting on a supporting surface, access to the fishing gear is only from one direction. Also, the items are not properly displayed nor observable.

Therefore, the principal object of my invention is to provide a tackle box that is so constructed that if the same is lifted by the lid, and the lock is accidentally not engaging the lid and box, the box contents will not be spilled therefrom.

A further object of this invention is to provide a tackle box structure that when in open condition, properly displays the items therein, and with the same being available from either side or either end of the box.

A still further object is to provide a tackle box that becomes automatically locked when the lid is closed and the handle is placed in carrying position.

A still further object is to provide a tackle box that is fabricated from non-rustable material, and one that has a clear plastic top to permit observation through the top of the lid.

Further objects of my invention are to provide a tackle box that is refined in appearance, durable in use, and economical in manufacture.

These and other objects will be apparent to those skilled in the art.

My invention consists in the construction, arrangement, and combination of the various parts of the device, whereby the objects contemplated are attained as hereinafter more fully set forth, and specifically pointed out in my claims, and illustrated in the accompanying drawings, in which:

Fig. 1 is a perspective view of my box ready for use,

Fig. 2 is a cross sectional view of the tackle box taken on line 2—2 of Fig. 1, and more fully illustrates its construction, Fig. 3 is a cross sectional view of the box taken on line 3—3 of Fig. 1, Fig. 4 is a vertical sectional view of the handle locking means taken on line 4—4 of Fig. 1, Fig. 5 is another vertical sectional view of the handle locking means, but taken on line 5—5 of Fig. 4, Fig. 6 is a cross sectional view of the box in open condition, Fig. 7 is a longitudinal sectional view taken on line 7—7 of Fig. 2, and Fig. 8 is a horizontal view taken on line 8—8 of Fig. 4.

In the drawings, I have used the numeral 10 to designate the lower box portion which is rectangular and open at its top. Near each of the inner ends thereof I have formed a vertical wall designated by the numerals 11 and 12, respectively. These walls and the box ends provide a compartment at each end of the box designated by the numerals 13 and 14.

The tray support elements, lid supports, and like, are at each end portion of the box and inasmuch as they are duplicate parts, I will explain only one end portion, it being understood that a like structure is at the other end of the box. In the center of each end compartment, 13 and 14, I have fixed a vertical dove-tail grooved post 15 as shown in Fig. 6. The numeral 16 designates the lid portion, open at its bottom, and having its two ends extending further downwardly to engage the tops of the ends of the box 10, when the lid is in closed condition. By this structure the sides of the lid are open to accommodate the stacked trays 17, 18, 19 and 20. The numeral 21 designates vertical bar posts extending downwardly from the inside center of each inside end of the lid. These two vertical bar posts are slidably extended into the dove-tail grooves of the two end posts 15, respectively. Thus, the lid 16 is capable of but two directions of movement, i. e., slidably up and down relative to the box portion 10. On the lower end of each of the bar posts is a bearing stud 22. The numeral 23 designates a bar link at each end of the two trays 17 and 18. Each of these bars is pivotally hinged to the upper end center of the tray 17 at one end and pivotally hinged at its other end to the outer and upper end of the tray 18. The trays 19 and 20 are similarly pivotally connected by the bar links 24. The numeral 25 designates an elongated bar link at each end of the tray 17. Each of these bars 25 are pivotally hinged to the upper inner ends of the tray 17 at one end and are pivotally hinged at their other end to the top outer end of the two walls 11 and 12, respectively. Similar bar links 26 pivotally connect the tray 20 to the partitions. The numeral 27 designates a bar link at each end of the tray 18. These bar links are each pivotally hinged at one end to the inner top end portions of the tray 18 at one end and are pivotally hinged at their other ends to the top center of the two partitions 11 and 12, respectively. The numeral 28 designates a similar bar link connecting the tray 19 to the partitions.

The numeral 29 designates a link bar at each end of the device. These link bars each have one end pivotally hinged to the center of a link bar 25, respectively and their other end provided with a slot for slidably pivotally engaging the stud bearings 22, respectively. Similar link bars 30 connect the center of the link bars 26 to the stud bearings 22. This assembly of the various bar links and their operation are, therefore, at each end of the device, with the lower ends of the bar links 25, 26, 27, 28, 29 and 30 extending into the compartments at each end of the box, and with their upper ends at the outside ends of the trays. Thus these parts are substantially shielded from contact with items in the box and trays. The arrangement of parts is shown in Figs. 2 and 6. When the lid is forced downwardly the posts 21 will move downwardly within the elements 15, lowering the stud bearings 22 and bringing the trays into stacked arrangement over the open top of the box. At this time the lid is in lowered position covering the open tops of the two uppermost trays 17 and 20. By raising the lid directly upwardly relative to the box, the trays will be raised upwardly and outwardly to both sides of the box, leaving the box substantially open and all trays open. This exploded arrangement is illustrated in Fig. 6. The numeral 31 designates a stop on each of the members 15 for limiting the upward sliding movement of the lid. With the lid in an upward position the two ends of the device will be open, the lid will be substantially above the box and all of the trays will be substantially clear of the vertical plane of the lid. Inasmuch as the lid slides directly upwardly from the box, even if the device were lifted by the lid while it is in open condition, no hinge action will result between the lid and box, and, therefore, the contents from the box and lids will not be spilled therefrom. When open, all contents within the device are available from both sides and both ends. In fishing on and near oceans the salt water will rapidly rust out metal tackle boxes, and the usual remedy is to use wooden boxes. Such boxes hold dampness and are undesirable. Therefore, I recommend that in my tackle box the box portion, lid and trays be made of suitable plastic or like and the necessary metal parts be of non-rust material, or rendered non-rustable by suitable plating. I show the top of the lid of transparent material so that the user can observe through it at all times.

I will now describe my handle lock means. The numeral 32 designates a vertical shaft journalled in the top center of the lid. The numeral 33 designates a disc plate secured to the lower end portion of the shaft 32 and under the lid. The numerals 34 and 35 designate two rods, having their inner ends horizontally hinged to the plate disc at points diametrically opposite from each other, as shown in Fig. 8. These two rods extend in opposite directions and have their outer end portions slidably extending through the brackets 36 on the under side of the lid. When the lid is shut and the shaft 32 is rotated to bring the two rods at maximum distance apart, their free ends are of such lengths as to pierce a hole in each of the grooved posts 15, respectively. Obviously when the rods are protruding into the posts 15, the lid will be locked shut onto the box portion and cannot be raised until the shaft is rotated in the opposite direction, as shown by the broken lines of Fig. 8. With the rod ends free of the posts 15 the lid may be manually lifted. The numeral 37 designates a foldable hinged handle means secured to the top of the shaft 32. This handle is to facilitate the carrying of the tackle box, the lifting and lowering of the lid, and the rotating of the shaft 32.

To prevent the accidental raising of the lid, I have provided an automatic locking means. The numeral 38 designates an L-shaft slidably extending through the lid and adjacent the handle means. The lower horizontal portion of this shaft 38 is below and capable of entering a notch on the underside of the member 33 as shown in Fig. 5. A spring 39 yieldingly holds the rod shaft 38 upwardly and into the notch in the member 33. The numeral 40 designates a button head on the top of the shaft 38. By this arrangement of parts, when the handle is rotated to lock the device, the pawl portion of the shaft 38 will automatically lock the shaft 32 against rotation in any direction. To release the same it is merely necessary to depress the knob 40, at which time the handle may be rotated relative to the box, and the lid and trays lifted and extended.

Some changes may be made in the construction and arrangement of my fisherman's tackle box without departing from the real spirit and purpose of my invention, and it is my intention to cover by my claims, any modified forms of structure or use of mechanical equivalents which may be reasonably included within their scope.

I claim:

1. In a fishing tackle box, a lower box portion, a vertical element on each end of said box portion, a lid portion and a vertical member on each end of said lid portion vertically slidable on and to said vertical element on each end of said box portion, respectively, a means for limiting the upward movement of said lid portion relative to said box portion, a means for locking said lid portion in a lowered condition on said box portion at times, a handle means on said lid portion, a plurality of trays, and linkage means connecting said trays to said vertical members on said lid portion, whereby when said lid portion is raised from said box portion said trays will be elevated and spread apart from each other.

2. In a fishing tackle box, a lower box portion, a vertical element on each end of said box portion, a lid portion and a vertical member on each end of said lid portion vertically slidable on and to said vertical element on each end of said box portion, respectively, a means for limiting the upward movement of said lid portion relative to said box portion, a means for locking said lid portion in a lowered condition on said box portion at times, a handle means on said lid portion, two pairs of trays, and linkage means connecting each two trays of each pair of trays together, and all of said trays to said vertical members on said lid portion, whereby when said lid portion is raised relative to said box portion, said pairs of trays will move away from each other, and each tray of each pair will separate one from the other.

3. In a fishing tackle box, a lower box portion open at its top, a vertically grooved member having a hole at each end of said box portion, a lid portion, a vertical member on each end of said lid portion vertically slidably mounted in said two vertically grooved members, respectively, a stop means for limiting the upward sliding movement of said lid portion relative to said box portion, a vertical shaft journalled in said lid portion, a horizontal member on the lower end of said vertical shaft, two rods pivotally connected at one of their ends to said horizontal member at diametrically opposite points; said two rods being of such lengths as to be capable of engaging the holes of said vertically grooved members at one of their ends, respectively, when said shaft is rotated in one direction, and a handle means on said shaft.

4. In a fishing tackle box, a lower box portion open at its top, a vertically grooved member having a hole at each end of said box portion, a lid portion, a vertical member on each end of said lid portion vertically slidably mounted in said two vertically grooved members, respectively, a stop means for limiting the upward sliding movement of said lid portion relative to said box portion, a vertical shaft journalled in said lid, a horizontal member on the lower end of said vertical shaft, two rods pivotally connected at one of their ends to said horizontal member at diametrically opposite points; said two rods being of such lengths as to be capable of engaging the holes of said vertically grooved members at one of their ends, respectively, when said shaft is rotated in one direction, a handle means on said shaft, and a means for locking said horizontal member against rotation at times.

References Cited in the file of this patent

UNITED STATES PATENTS

| Number | Name | Date |
|---|---|---|
| 151,035 | Large | May 19, 1874 |
| 173,548 | Large | Feb. 15, 1876 |
| 530,469 | Boyd | Dec. 4, 1894 |
| 2,316,384 | Abramson | Apr. 13, 1943 |
| 2,649,137 | Roberts | Aug. 18, 1953 |